United States Patent
Liu et al.

(10) Patent No.: US 12,529,703 B2
(45) Date of Patent: Jan. 20, 2026

(54) KIT FOR DETECTING SOLUBLE GROWTH STIMULATION EXPRESSED GENE 2 PROTEIN

(71) Applicant: Beijing Strong Biotechnologies, Inc., Beijing (CN)

(72) Inventors: Yao Liu, Beijing (CN); Xi Liu, Beijing (CN)

(73) Assignee: Beijing Strong Biotechnologies, Inc., Beijing (CN)

( * ) Notice: Subject to any disclaimer, the term of this patent is extended or adjusted under 35 U.S.C. 154(b) by 1129 days.

(21) Appl. No.: 17/440,930

(22) PCT Filed: Jan. 21, 2020

(86) PCT No.: PCT/CN2020/073461
§ 371 (c)(1),
(2) Date: Sep. 20, 2021

(87) PCT Pub. No.: WO2020/192266
PCT Pub. Date: Oct. 1, 2020

(65) Prior Publication Data
US 2022/0163534 A1 May 26, 2022

(30) Foreign Application Priority Data
Mar. 28, 2019 (CN) .......................... 201910241518.7

(51) Int. Cl.
*G01N 33/68* (2006.01)
*G01N 21/31* (2006.01)
*G01N 33/543* (2006.01)
*G01N 35/00* (2006.01)

(52) U.S. Cl.
CPC ............ *G01N 33/68* (2013.01); *G01N 21/31* (2013.01); *G01N 33/54313* (2013.01); *G01N 35/00* (2013.01)

(58) Field of Classification Search
None
See application file for complete search history.

(56) References Cited

FOREIGN PATENT DOCUMENTS

| | | |
|---|---|---|
| CN | 104459164 A | 3/2015 |
| CN | 108107201 A | 6/2018 |
| CN | 108872592 A | 11/2018 |
| CN | 108535491 B | 11/2019 |
| CN | 111751544 B | 6/2023 |

OTHER PUBLICATIONS

Wang et al., Molecules 2020, 25, 4557; doi:10.3390 (Year: 2020).*
Zhou Jianping; EPO Machine translation of CN106018789 (Year: 2016).*
International Search Report; China National Intellectual Property Administration; International Application No. PCT/CN2020/073461; Apr. 14, 2020; 5 pages.
Written Opinion of the International Searching Authority: China National Intellectual Property Administration; International Application No. PCT/CN2020/073461; Apr. 14, 2020; 8 pages.
International Preliminary Report on Patentability; The International Bureau of WIPO; International Application No. PCT/CN2020/073461; Sep. 28, 2021; 9 pages.

* cited by examiner

*Primary Examiner* — Christina M Borgeest
(74) *Attorney, Agent, or Firm* — Taft Stettinius & Hollister LLP

(57) ABSTRACT

The present disclosure relates to a kit for detecting a soluble growth stimulation expressed gene 2 protein. In particular, the present disclosure relates to a latex-enhanced turbidimetric immunoassay kit for detecting the concentration and/or content of the sST2 in human samples. The kit can be used in transmission immunoturbidimetry and scattering immunoturbidimetry. The kit comprises a buffer system, an anti-interference component, latex microspheres, an anti-sST2 antibody, etc. The latex-enhanced immunoturbidimetric agent of the present disclosure can detect sST2 proteins within a range of <400 ng/ml in a sample, with a sensitivity of up to 0.1 ng/ml and a high specificity, accuracy and precision. The kit is suitable for a fully automatic biochemical analyzer and a scattering analyzer, and has the advantages of convenient and fast use and low cost, and can be used clinically to detect the sST2 protein.

4 Claims, 5 Drawing Sheets

KIT FOR DETECTING SOLUBLE GROWTH STIMULATION EXPRESSED GENE 2 PROTEIN

CROSS-REFERENCE TO RELATED APPLICATIONS

This application is a U.S. National Phase of International PCT Application No. PCT/CN2020/073461 filed Jan. 21, 2020, which claims priority to Chinese Patent Application Serial No. 201910241518.7 filed Mar. 28, 2019, the contents of each application are incorporated herein by reference in their entireties.

TECHNICAL FIELD OF THE INVENTION

The present disclosure relates to a kit for detecting a soluble growth stimulation expressed gene 2 protein and protein product (sST2) thereof in human blood. In particular, the present disclosure relates to a latex-enhanced turbidimetric immunoassay kit for detecting the concentration or content of the sST2. The kit can be used in transmission immunoturbidimetry and scattering immunoturbidimetry.

BACKGROUND OF THE INVENTION

The isolation of murine specific growth stimulation expressed genes from BALB/c-3T3 cells was described by Tominaga; they called one of these genes "St2" (for growth stimulation expressed gene 2). The St2 gene encodes two protein products: ST2, which is a soluble secreted form; and ST2L, a form of transmembrane receptor very similar to the interleukin-1 receptor. The HUGO Nomenclature Committee refers to the human homologue as interleukin 1 receptor-like 1 (IL1R-L1).

ST2 is a member of the interleukin-1 receptor family and has two existing forms: transmembrane (ST2L) and soluble (sST2). Th (helper T cell) can secrete a variety of cytokines. Th cells express CD4, and the so-called CD4+ T cell refers to Th. HIV can specifically damage Th cells, causing destroyed immune system of patients. ST2L has immunomodulatory functions and plays an important role in T cell-mediated immune diseases such as asthma and rheumatoid arthritis.

ST2L neutralizing antibody or sST2 will block the binding of ST2L to ligands, thereby down-regulating Th2 (Th2 cells mainly secrete IL-4, IL-5, IL-6 and IL-10, etc., the main function thereof is to stimulate B cell proliferation and produce antibodies of immunoglobulin G1 and immunoglobulin E, and are related to humoral immunity). Lymphocyte function suggests that sST2 has an inhibitory effect on inflammation.

SUMMARY OF THE INVENTION

According to some embodiments of the application, provided is a detection kit for soluble growth stimulation expressed gene 2 protein, which comprises:
a first reagent,
a second reagent,
optionally, calibrator(s),
optionally, control material(s).
In some embodiments, the first reagent comprises:
10 mmol/L to 500 mmol/L buffer, with pH range of 5.0 to 8.0,
10 mmol/L to 700 mmol/L dispersing agent,
0.05% to 5% w/v coagulant,
anti-interference composition, and
optionally, 0.05% to 0.5% w/v preservative.
In some embodiments, the second reagent comprises:
10 mmol/L to 500 mmol/L buffer,
0.05% to 0.25% w/v latex microspheres, and
anti-sST2 antibody or antigen-binding fragment thereof.

In some embodiments, the buffer in the first reagent and the second reagent is the one or combination thereof selected from the group consisting of: HEPES buffer, glycine buffer, Tris buffer, PBS buffer, MOPS buffer and boric acid buffer.

In specific embodiments, the buffer of the second reagent is boric acid buffer, pH 9.0.

In some embodiments, the dispersing agent is the one or combination thereof selected from the group consisting of: salt ion, thiocyanate, organic dispersant and surfactant.

In some embodiments, the coagulant is the one or combination thereof selected from the group consisting of: polyethylene glycol, methacryloyloxy phosphatidylcholine and polyether diamine.

In some embodiments, the preservative is the one or combination thereof selected from the group consisting of: azide and PC preservative.

In some embodiments, the surface functional group of the latex microspheres is selected from one of the following: carboxyl, sulfhydryl, chloromethyl or without surface functional group.

In some embodiments, the average particle size of the latex microspheres is 300 nm to 600 nm, preferably 350 nm to 450 nm.

In some embodiments, the anti-sST2 antibody is the one or combination thereof selected from the group consisting of: non-affinity IgG antibody, affinity IgG antibody and IgY antibody.

In some embodiments, the anti-sST2 antibody is derived from murine, rabbit, goat or avian.

In some embodiments, the anti-sST2 antibody is a monoclonal antibody or a polyclonal antibody.

In specific embodiments, the antigen-binding fragment is selected from: Fab, Fab', (Fab')2, Fv or scFv.

In some embodiments, the anti-sST2 antibody or antigen-binding fragment thereof is covalently bound to the surface of the latex microspheres.

In some embodiments, the anti-interference composition comprises: 0.1% to 10% w/v surfactant, and 0.5 KU/L to 10 KU/L lipid digesting enzyme.

In some embodiments, the surfactant is the one or combination thereof selected from the group consisting of: Triton X, Tween, AEO, Thesit, Brij and NP.

In some embodiments, the lipid digestive enzyme is the one or combination thereof selected from the group consisting of: lipase and triglyceride oxidase.

In some embodiments, the blocking agent on the surface of the latex microspheres is the one or combination thereof selected from the group consisting of: polyethylene glycol, polyethylene glycol polyamine, bovine serum albumin, dextran gel and casein.

In some embodiments, the first reagent also comprises a blocker; the blocker is the one or combination thereof selected from the group consisting of: murine serum, murine IgG murine IgM, goat IgG and goat IgM; the concentration of the blocker is 0.1% to 5% w/v.

In some embodiments, the calibrator(s) comprise(s) sST2 of known concentration. In specific embodiments, the calibrator(s) comprise(s) 25 ng/mL, 50 ng/mL, 100 ng/mL, 200 ng/mL or 400 ng/mL of sST2 protein.

In some embodiments, the control material(s) comprise(s) sST2 of known concentration. In specific embodiments, the control material(s) comprise(s): 30 ng/mL or 100 ng/mL of sST2 protein.

In some embodiments, the calibrator(s) or the control material(s) comprise(s) a buffer selected from the following: phosphate buffer, HEPES buffer, MOPS buffer, IVIES buffer and PIPES buffer. In some embodiments, the concentration of the buffer is 5 mmol/L to 250 mmol/L; pH is 4.0 to 8.0. The calibrator(s) or the control material(s) also comprise(s) 1.0% to 10% w/v protectant (for example selected from: bovine serum albumin, saccharide and alcohol). The calibrator(s) or the control material(s) also comprise(s) 0.05% to 1.5% w/v preservative (for example selected from: sodium azide, PC and dithiothreitol).

In specific embodiments, provided is a detection kit for soluble growth stimulation expressed gene 2 protein, comprising:

the first reagent, comprising 200 mmol/L sodium chloride, 1% surfactant, 0.1% sodium azide and 100 mmol/l HPEPS buffer, pH 8.0;

the second reagent, comprising 0.1% w/v 400 nm latex microspheres and 30 µg/ml anti-sST2 monoclonal antibody.

In another specific embodiment, provided is a detection kit for soluble growth stimulation expressed gene 2 protein, comprising:

the first reagent, comprising 150 mmol/L sodium chloride, 1% surfactant, 0.1% sodium azide, 5 KU/L lipase, 0.5% methacryloyloxy phosphatidylcholine and 100 mmol/l Tris buffer, pH 7.4;

the second reagent, comprising 0.15% w/v 400 nm latex microspheres, 20 µg/ml sST2 antibody Fab fragment, 100 mmol/L glycine buffer pH 8.0, 0.1% NaCl, 0.5% methacryloyloxy phosphatidylcholine and 0.1% $NaN_3$.

In another specific embodiment, provided is a detection kit for soluble growth stimulation expressed gene 2 protein, comprising:

the first reagent, comprising 1% surfactant, 0.1% sodium azide, 5 KU/L lipase, 2% sodium cholate, 5 mmol/l $CaCl_2$, 2.0% methacryloyloxy phosphatidylcholine, 3% blocker HBR-8™ and 200 mmol/l Tris buffer, pH 7.4;

the second reagent, comprising 0.15% w/v 400 nm latex microspheres, 20 µg/ml sST2 antibody Fab fragment, 100 mmol/L glycine buffer pH 8.0, 0.1% NaCl, 0.5% methacryloyloxy phosphatidylcholine and 0.1% $NaN_3$.

The above kits optionally comprise calibrator(s) and/or control material(s), which comprise(s) sST2, 100 mmol/L phosphate buffer pH 5.5, 150 mmol/L NaCl, 5% BSA, 10% sorbitol and 0.1% $NaN_3$.

According to the embodiments of the present application, there is also provided an anti-interference composition, which comprises 0.1% to 10% w/v surfactant and 0.5 KU/L to 10 KU/L lipid digesting enzyme. The surfactant is the one or combination thereof selected from the group consisting of: Triton X, Tween, AEO, Thesit, Brij and NP. The lipid digestive enzyme is the one or combination thereof selected from the group consisting of: lipase and triglyceride oxidase.

According to the embodiments of the present application, there is also provided use of the anti-interference composition in the preparation of an immuno-turbidimetric kit.

According to the embodiments of the present application, there is also provided a reagent, which comprises the anti-interference composition of the present application.

According to the embodiments of the present application, there is also provided an improved method for fixing polypeptides to latex microspheres, comprising the steps:

1) providing polypeptide, preferably providing polypeptide in a buffer;

2) providing latex microspheres, preferably providing latex microspheres in a buffer;

3) mixing the polypeptide with the latex microspheres at 10° C. to 35° C. (preferably 20° C. to 25° C.) (preferably by shaking and mixing) for 6 to 10 hours (preferably 7 to 9 hours) to obtain a first mixture;

4) providing a crosslinking agent, preferably carbodiimide;

5) contacting the crosslinking agent with the first mixture at 30° C. to 60° C. (preferably 45° C. to 55° C.) for 2 to 5 hours (preferably 2 to 4 hours) to obtain latex microspheres cross-linked with polypeptide.

In the context of the present application, step 1) and step 2) can be interchanged in order.

In the context of the present application, the step 4) can be interchanged with step 1), 2) and 3) in order, respectively.

In some embodiments, the polypeptide is a polypeptide carrying amino, carboxyl, hydroxyl or sulfhydryl; preferably, the polypeptide is selected from: antibody, antigen-binding fragment, antigen, enzyme and recombinant protein.

In some embodiments, the surface functional group of the latex microspheres is selected from one of the following: carboxyl, sulfhydryl, chloromethyl or without surface functional group.

In some embodiments, the average particle size of the latex microspheres is 300 nm to 600 nm, preferably 350 nm to 450 nm.

In some embodiments, the buffer in step 1) and step 2) is the one or combination thereof selected from the group consisting of: HEPES buffer, glycine buffer, Tris buffer, PBS buffer, MOPS buffer and boric acid buffer; the buffer provides pH of 7.0 to 9.0.

In specific embodiments, the buffer in step 1) and step 2) is boric acid buffer, pH9.0; the concentration of the buffer is 10 mmol/l to 1000 mmol/l.

In some embodiments, a blocking step is also included: contacting the latex microspheres cross-linked with polypeptide with a blocking system at 15° C. to 28° C. for 1 hour to 24 hours; in some embodiments, the blocking system comprises a blocking agent, a buffer with pH 5.0 to 8.0 and a surfactant. The blocking agent is the one or combination thereof selected from the group consisting of: 0.1% to 5.0% w/v polyethylene glycol with a molecular weight of 1000 to 5000; 0.1% to 5.0% w/v polyethylene glycol polyamine with a molecular weight of 1000 to 5000; 2.0% to 10.0% w/v bovine serum albumin; 2.0% to 10.0% w/v dextran gel; and 2.0% to 10.0% w/v casein. In some embodiments, the buffer is selected from: phosphate buffer, glycine buffer and HEPES buffer. In some embodiments, the surfactant is the one or combination thereof selected from the group consisting of: 2.0% to 8.0% w/v Triton X, 2.0% to 8.0% Tween and 2.0% to 8.0% w/v AEO.

In some embodiments, after the blocking step, an optional step is further included, wherein the step is the one or combination thereof selected from the group consisting of: rinsing the latex microspheres cross-linked with polypeptide, centrifuging and collecting the latex microspheres cross-linked with polypeptide, and packaging the latex microspheres cross-linked with polypeptide.

DETAILED DESCRIPTION OF THE EMBODIMENTS

Examples

Example 1. The Effects of Buffer and pH on the Absorbance of Reagents

1. The first reagent:
200 mmol/L sodium chloride,
1% surfactant (Triton X 100),
0.1% sodium azide,
100 mmol/l HPEPS buffer, pH 8.0,
the first reagent was a colorless or slightly yellow transparent liquid.

2. The second reagent:
Methods of Preparation:
(1) each of 0.5 mL latex microspheres with a particle size of 400 nm was added to 4.5 mL of boric acid pH 9.0, carbonic acid pH 9.0, HEPES pH 8.0, Tris pH 8.0, PBS pH 7.0 or HEPES pH 7.0 buffers, respectively, to obtain latex microsphere suspensions;
(2) each of 1 mg anti-sST2 monoclonal antibody was added to 4.5 mL of boric acid pH 9.0, carbonic acid pH 9.0, HEPES pH 8.0, Tris pH 8.0, PBS pH 7.0 or HEPES pH 7.0 buffers, respectively, to obtain antibody solutions;
(3) the antibody solutions and the latex microsphere suspensions were mixed at 20° C. by mixing and shaking for 8 hours;
(4) 25 mg carbodiimide was dissolved in 8 mL deionized water to prepare and obtain a carbodiimide aqueous solution for later use;
(5) the carbodiimide aqueous solution was added to the mixed solution of step (3) for reaction and activation at 60° C. for 4 hours to obtain cross-linked latex-antibody suspensions;
(6) a blocking solution containing BSA was added for blocking overnight at room temperature (15° C. to 28° C.);
(7) the mixed solutions were centrifuged at 4° C., 14000 rpm for 30 minutes; (8) the supernatant was removed and 50 ml working solution was added (100 mmol/L HEPES buffer pH 8.0, 0.1% NaCl, 1% sucrose and 0.1% $NaN_3$);
(9) resuspended for later use.

3. Calibrator(s) and control material(s):
sST2 recombinant antigen,
100 mmol/L HEPES buffer pH 7.5,
100 mmol/L NaCl,
0.1% $NaN_3$.

4. Detection:
detection tool: Beckman AU5800 automatic biochemical analyzer;
analysis mode: FIXED;
wave length: 660 nm;
amount of samples: 10 μL; R1: 150 μL; R2: 50 μL;
calibration method: SPLINE, 6-point calibration; reaction direction: ascending.

Figure 1:
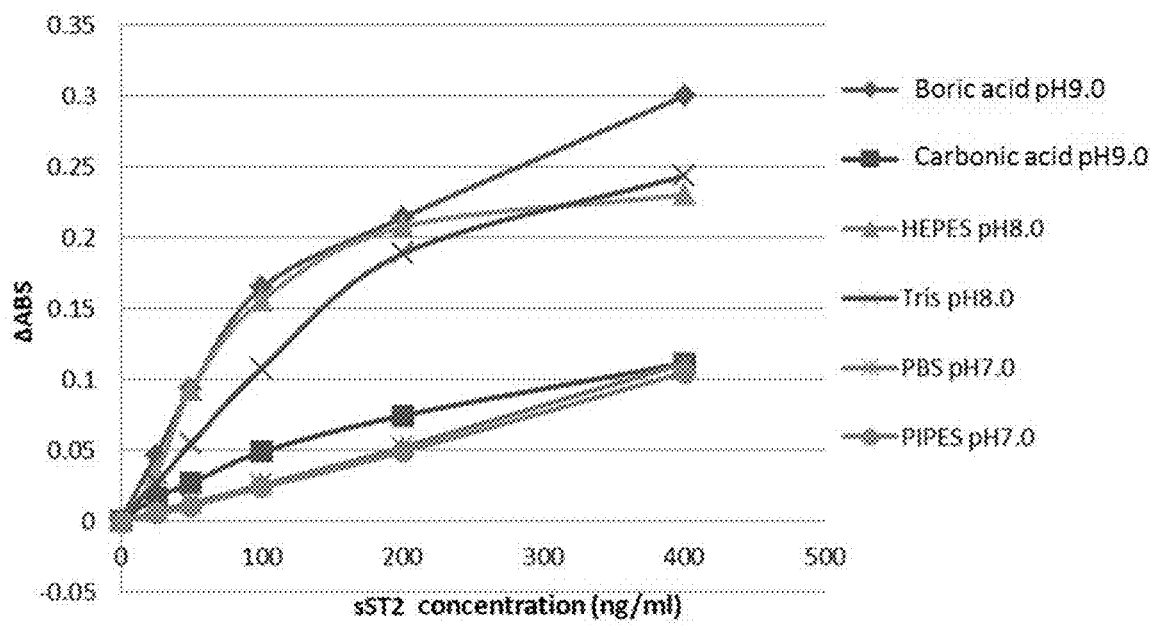
FIG. 1: the effects of different cross-linking buffer systems on the absorbance of reagents after cross-linking.

According to FIG. 1, it was shown that different buffer types and pH conditions had different effects on the absorbance of reagents. According to the results, preferably, boric acid buffer, pH 9.0 was the optimal cross-linking environment.

Example 2. The Effects of Different Temperatures on the Absorbance of Reagents

1. The first reagent: same with Example 1.
2. The second reagent:
(1) each of 0.5 mL latex microspheres with a particle size of 400 nm was added to 4.5 mL boric acid pH 9.0 buffer, respectively, to obtain latex microsphere suspensions;
(2) each of 1 mg anti-sST2 monoclonal antibody was added to 4.5 mL boric acid pH 9.0 buffer, respectively, to obtain antibody solutions;
(3) each of 2 ml of the antibody solutions and the latex microsphere suspensions were mixed at 10° C., 15° C., 20° C., 25° C., 30° C. and 35° C., respectively, by mixing and shaking for 8 hours;
(4) to (7) were the same with Example 1;
(8) the supernatant was removed, and each of 10 ml working solution was added (100 mmol/L HEPES buffer pH 8.0, 0.1% NaCl, 1% sucrose and 0.1% $NaN_3$);
(9) resuspended for later use.

3. Calibrator(s) and control material(s):
same with Example 1.

Figure 2:
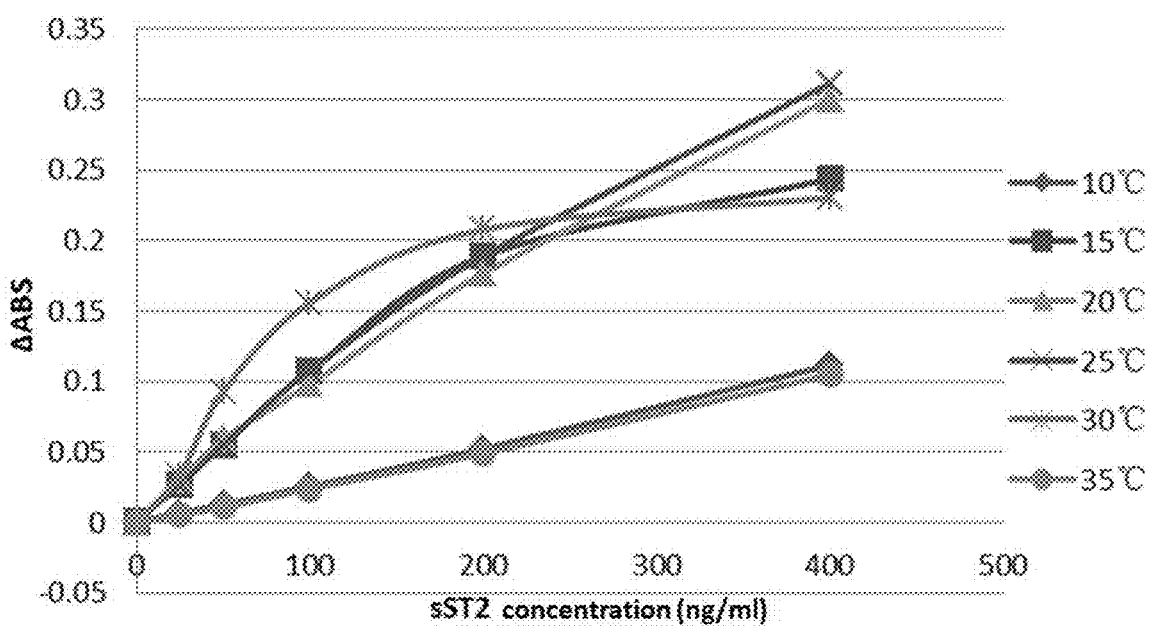
FIG. 2: the effects of different cross-linking temperatures on the absorbance after cross-linking.

4. Detection:
According to FIG. 2, it was shown that different temperatures had different effects on the absorbance of reagents. According to the results, preferably, boric acid buffer, 20° C. to 25° C. was the optimal cross-linking environment.

Example 3. The Activation Effects of Different Temperatures on the Functional Groups of Latex 1. The first reagent: same with Example 1.
2. The second reagent:
Methods of Preparation:
(1) same with Example 2;
(2) same with Example 2;
(3) the antibody solutions and the latex microsphere suspensions were mixed and shaken at 25° C. for 8 hours;
(4) same with Example 1;
(5) the carbodiimide aqueous solution was added to the mixed solution of step (3), and each of 2 ml mixed solutions was placed at 30° C., 40° C., 45° C., 50° C., 55° C. and 60° C. for reaction and activation for 4 hours to obtain completely cross-linked latex-antibody suspensions;
(6) to (8) were the same with Example 2;
(9) resuspended for later use.

3. Calibrator(s) and control material(s): same with Example 1.

Figure 3:
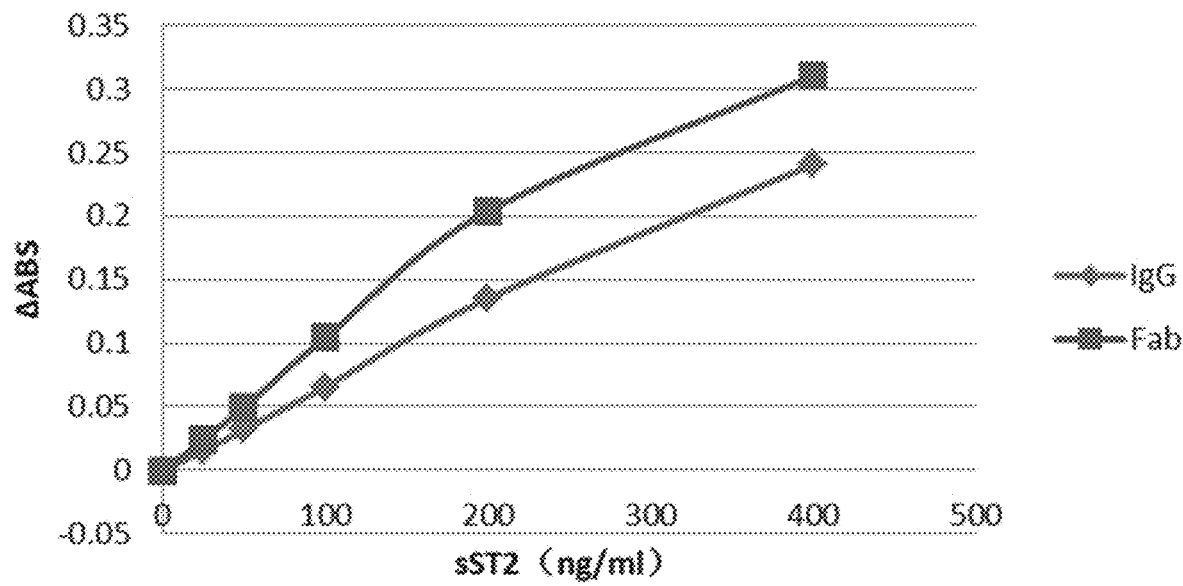
FIG. 3: the effects of different EDC activation temperatures on the absorbance of reagents.

4. Detection:
According to FIG. 3, it was shown that EDC at different temperatures had different activation effects on the latex functional groups (for example carboxyl), and finally had different effects on the absorbance of reagents. According to the results, preferably, boric acid buffer, 45° C. to 55° C. was the optimal activation environment.

Example 4. Antibody Affinity of Fab Fragment Antibodies

Figure 4:
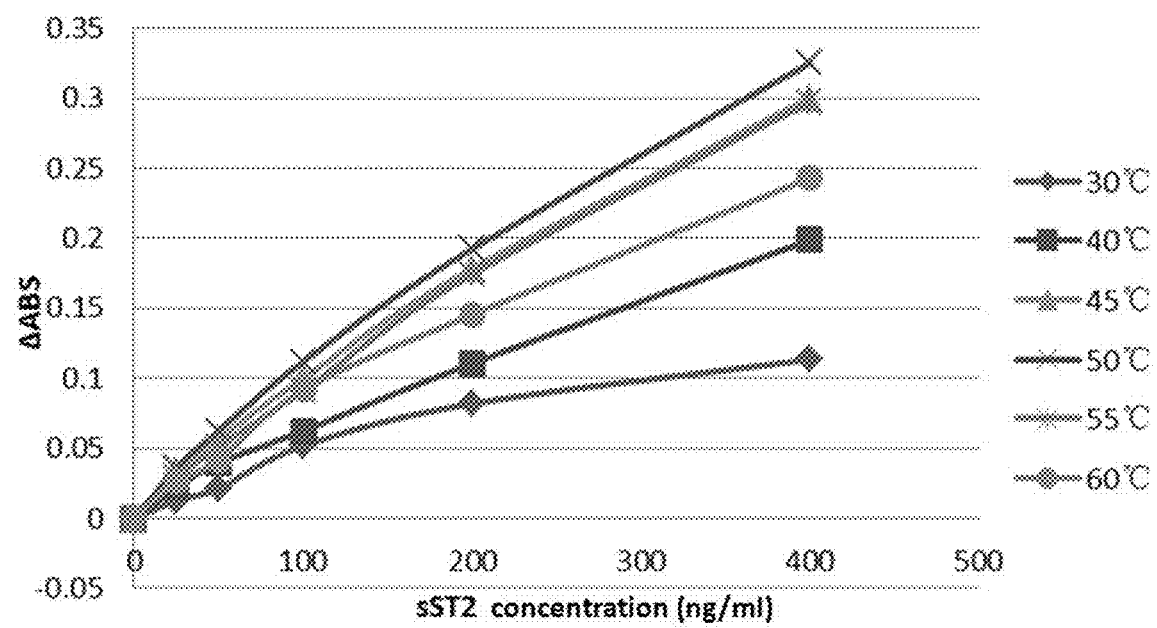
FIG. 4: the effects of different antibodies on the absorbance of reagents after cross-linking.

1. The first reagent: same with Example 1.
2. The second reagent:
Methods of Preparation:
(1) same with Example 2;
(2) each of 1 mg anti-sST2 monoclonal antibody (IgG type and Fab fragment) was added to 4.5 ml boric acid pH 9.0 buffer, respectively, to obtain antibody solutions;
(3) same with Example 3;
(4) same with Example 1;
(5) the carbodiimide aqueous solution was added to the mixed solution of step (3) and placed at 50° C. for reaction and activation for 4 hours to obtain completely cross-linked latex-antibody suspensions;
(6) to (8) were the same with Example 1;
(9) resuspended for later use.
3. Calibrator(s) and control material(s): same with the examples.
4. Detection:
According to FIG. 4, it was shown that the Fab fragment antibodies had high antibody affinity and high detection absorbance. The detection sensitivity of reagents could be improved to a higher degree.

Example 5. Optimization of Blocking of the Latex

1. The first reagent: same with Example 1.
2. The second reagent:
Methods of Preparation:
(1) same with Example 2;
(2) each of 1 mg anti-sST2 Fab fragment recombinant monoclonal antibody was added to 4.5 ml boric acid pH 9.0 buffer, respectively, to obtain antibody solutions;
(3) same with Example 3;
(4) same with Example 1;
(5) same with Example 4;
(6) 2 ml of each was added to different blocking solutions for blocking overnight at room temperature. The composition of the blocking solution was shown in Table 1.

TABLE 1

The composition of the blocking solution

| Components | Concentration in the system (w/v) |
|---|---|
| Polyethylene glycol polyamine | 1% |
| BSA | 1% |
| Tween | 1% |
| Casein | 0.05% |
| Polyethylene glycol polyamine + BSA | 1% + 1% |

Figure 5:
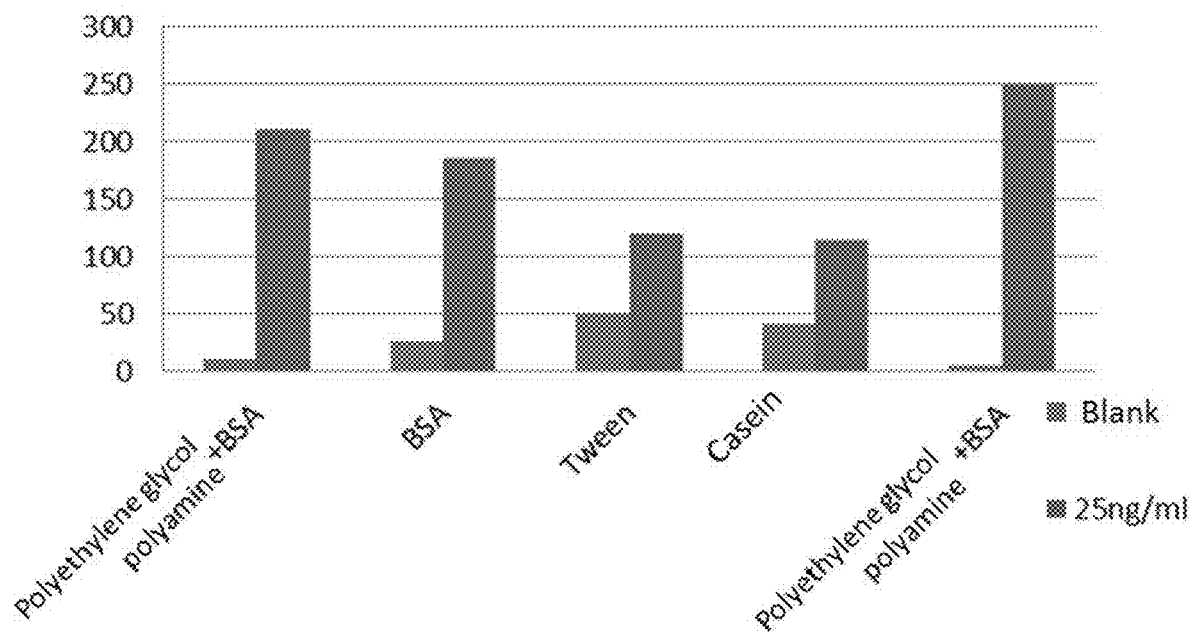
FIG. 5: the effects of different blocking systems on absorbance of blank and sensitivity of the reagents.

(7) to (8) were the same with Example 1;
(9) resuspended for later use.
3. Calibrator(s) and control material(s): same with Example 1.
4. Detection:
According to FIG. 5, it was shown that polyethylene glycol polyamine could effectively bind to the activated carboxyl that was not bound to antibodies, neutralize its charge and reduce the adsorption of the carboxyl to proteins upon activation. BSA could effectively attach to the surface of latex microspheres, reduce the adsorption of proteins onto the surface of latex microspheres.

Example 6. Preparation of sST2 Detection Kit (Containing the Anti-Interference Composition)

1. The first reagent:
150 mmol/L sodium chloride,
1% surfactant (Brij 35),
0.1% sodium azide,
5 KU/L lipase,
0.5% methacryloyloxy phosphatidylcholine,
100 mmol/l Tris buffer, pH 7.4.
2. The second reagent comprises:
0.15% w/v 400 nm latex microspheres,
recombinant Fab fragment of monoclonal antibody 20 μg/ml,
100 mmol/L glycine buffer pH 8.0,
0.1% NaCl,
0.5% methacryloyloxy phosphatidylcholine,
0.1% $NaN_3$.
The preparation process of latex microspheres was the same with Example 5.
3. Calibrator(s) and control material(s): same with Example 1.
4. Detection of precision for the reagent: see Table 2.

TABLE 2

Precision of the reagents prepared in Example 6

| | Repeatability (n = 20) | Intermediate precision (n = 80) |
|---|---|---|
| Quality control 1 (30 ng/ml) | 1.50% | 1.78% |
| Quality control 2 (100 ng/ml) | 0.90% | 1.01% |
| Sample (20 ng/ml) | 2.1% | 3.40% |

Example 7. Preparation of sST2 Detection Kit (Containing the Blocker+the Anti-Interference Composition)

1. The first reagent:
1% surfactant (Thesit),
0.1% sodium azide,
5 KU/L lipase,
2% sodium cholate,
5 mmol/l $CaCl_2$,
2.0% methacryloyloxy phosphatidylcholine,
3% blocker
200 mmol/l Tris buffer, pH 7.4.
2. The second reagent comprises:
same with Example 6.
3. Calibrator(s) and control material(s): same with Example 1.

TEST EXAMPLES

Test Example 1. Reagent Specificity

To adjust the first reagent, the introduction of surfactant and lipase system improved the detection accuracy of the reagent when detecting samples with high level of chyle. The detection accuracy of the reagent for high RF samples was improved by adding a blocker. Detailed data can be seen in Table 3.

TABLE 3

Anti-interference effect

| Interference | Example 6 (ng/ml) | Example 7 (ng/ml) |
|---|---|---|
| Control | 25.0 | 26.7 |
| 500 mg/dl hemoglobin | 24.8 | 25.2 |
| 1000 mg/dl triglyceride | 0.8 | 26.1 |
| 500 IU/L rheumatoid factors (RF) | 51.0 | 25.1 |
| 40 mg/dl bilirubin | 23.8 | 26.4 |

Test Example 2. Linearity

Figure 6:
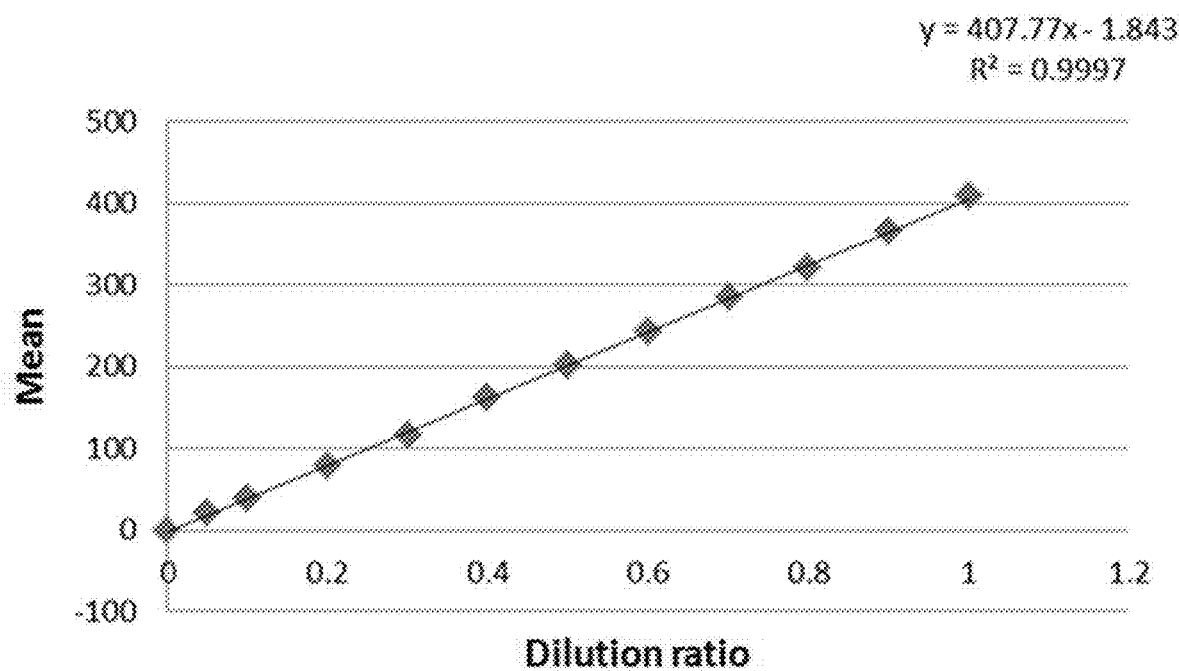
FIG. 6: linearity results of the kit of the present disclosure.

High-concentration samples were used and diluted at a fixed ratio by using normal saline. The detection results were $R^2 > 0.99$ (see FIG. 6).

Test Example 3. Pre-Zone Effects

Figure 7:
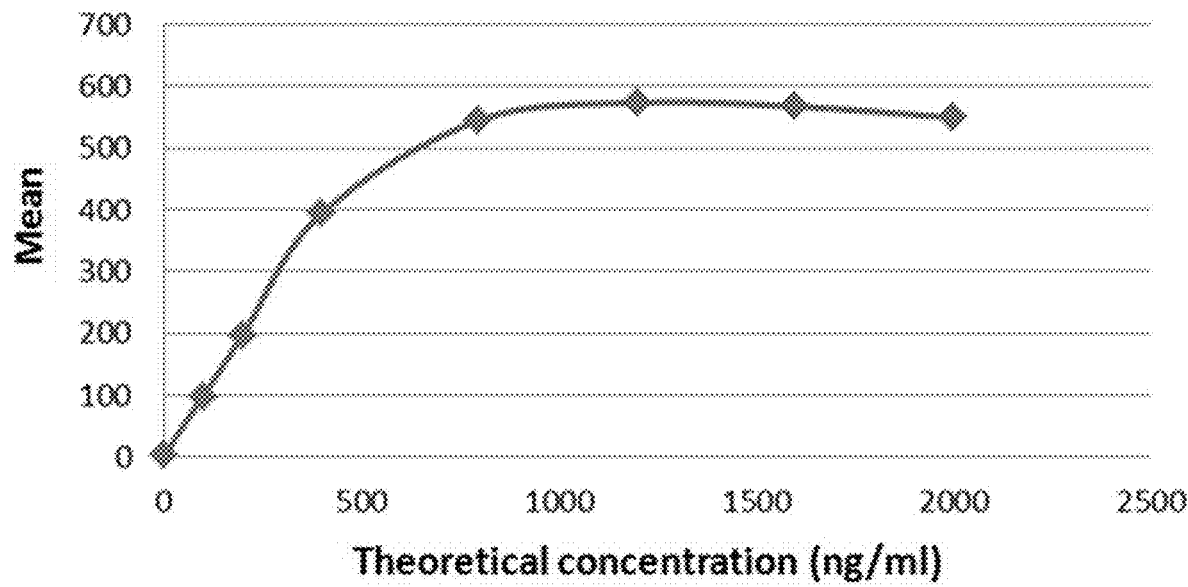
FIG. 7: pre-zone results of the kit of the present disclosure.

The antigen sST2 protein with theoretical concentration of 2000 ng/ml was used and diluted with normal saline at certain proportions. The samples with theoretical concentration of 2000 ng/ml were detected, and the detection result goes beyond the linear range (see FIG. 7).

Test Example 4. Sensitivity

When using scatter immunoturbidity analysis, conventional samples and normal saline were diluted. Samples of each level were tested for 20 times and CV was calculated. CV<10% was deemed as LoQ.

Figure 8:
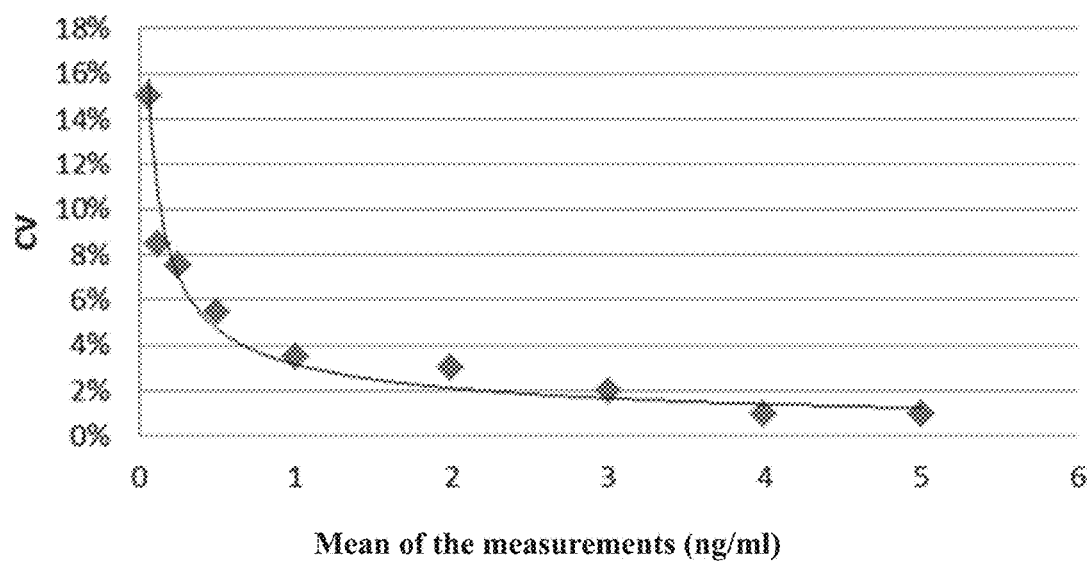
FIG. 8: sensitivity results of the kit of the present disclosure.
Figure 9:
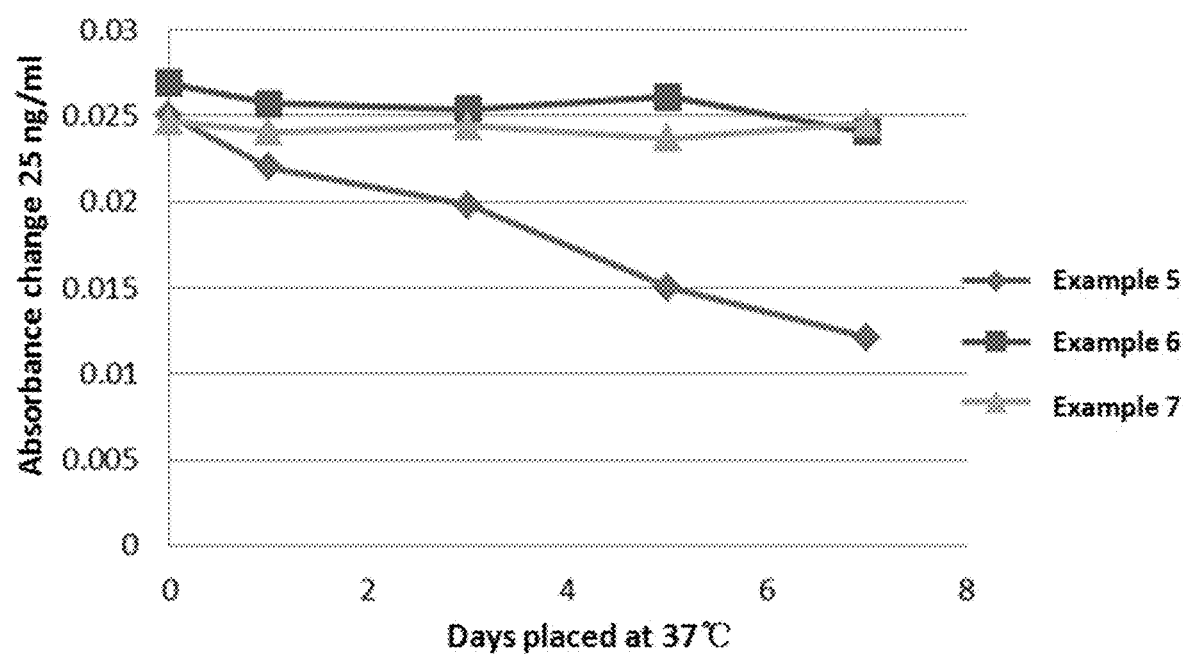
FIG. 9: stability results of the kit of the present disclosure.

The detection result of the kit of Example 7 was LoQ=0.1 ng/ml (see FIG. 8).

Test Example 5. Establishment of Clinical Reference Range

Physical examination samples were collected, and grouped according to gender. Heart disease, inflammatory disease, tumor and other related diseases were excluded. 120 cases of males and 120 cases of females were tested and analyzed, and the results were as follows:

TABLE 4

Clinical reference range

|  | Male | Female |
|---|---|---|
| Mean value | 30.0 ng/ml | 20.5 ng/ml |
| Sd | 3.5 ng/ml | 3.7 ng/ml |
| 99% quantile | 42.1 ng/ml | 32.4 ng/ml |

Test Example 6. Performance on Diagnosis of Disease

The kit of Example 7 was used with the clinical reference range: 0.1 ng/ml to 35 ng/ml for normal population, and the result determination was detected.

TABLE 5

Reference range

| Diagnosis | Mean value of sST2 (ng/ml) | Positive results |
|---|---|---|
| Healthy controls (n = 50) | 30 ng/ml | 3 cases (94%) |
| Patients (n = 50) | 156 ng/ml | 35 cases (70%) |

Test Example 7. Stability of the Reagents

The stability test was carried out using the kits in Examples 5 to 7. The reagents were added for the stability test at 37° C. The kits of Examples 6 and 7 exhibited the best stability. After accelerating at 37° C. for 7 days, the calibrated absorbance of the reagents showed no significant changes.

What claimed is:

1. A detection kit for soluble growth stimulation expressed gene 2 (sST2) protein, comprising:
a first reagent,
a second reagent,
wherein, the first reagent comprises:
  1% w/v Dodecyl alcohol polyoxyethylene ether,
  0.1% w/v sodium azide,
  5 KU/L lipase,
  2% w/v sodium cholate,
  5 mmol/l $CaCl_2$,
  2.0% w/v methacryloyloxy phosphatidylcholine,
  3% w/v blocker Heterophilic Blocking Reagent, and
  200 mmol/l Tris (hydroxymethyl) aminomethane buffer, pH 7.4;
the second reagent comprises:
  0.15% w/v latex microspheres,
  20 μg/ml anti-sST2 antibody Fab fragment,
  100 mmol/L glycine buffer pH 8.0,
  0.1% w/v NaCl,
  0.5% w/v methacryloyloxy phosphatidylcholine and
  0.1% w/v $NaN_3$;
wherein,
the latex microspheres comprise surface functional groups selected from the group consisting of: carboxyl, sulfhydryl, chloromethyl, and any combination thereof;
the average particle size of the latex microspheres is 350 nm to 450 nm;
the anti-sST2 antibody is selected from the group consisting of: non-affinity IgG antibody, affinity IgG antibody and IgY antibody;
the anti-sST2 antibody is derived from murine, rabbit, goat, camel or avian; and
the anti-sST2 antibody or antigen-binding fragment thereof is covalently bound to the surface of the latex microspheres.

2. The detection kit for soluble growth stimulation expressed gene 2 protein according to claim 1, wherein a blocking agent on the surface of the latex microspheres is selected from the group consisting of: polyethylene glycol, polyethylene glycol polyamine, bovine serum albumin, dextran gel and casein.

3. The detection kit for soluble growth stimulation expressed gene 2 protein according to claim 1, wherein the kit further comprises:
a calibrator(s), which comprise(s): 25 ng/mL, 50 ng/mL, 100 ng/mL, 200 ng/ml or 400 ng/ml of sST2 protein; and/or a control material(s), which comprise(s): 30 ng/ml or 100 ng/ml of sST2 protein;

wherein, the calibrator(s) or the control material(s) comprise(s) a buffer selected from the group consisting of: phosphate buffer, HEPES buffer, MOPS buffer, MES buffer and PIPES buffer;

the concentration of the buffer is 5 mmol/L to 250 mmol/L;

the pH of the buffer is 4.0 to 8.0;

the calibrator(s) or the control material(s) comprise(s) 1.0% to 10% w/v protectant, which is selected from the group consisting of: bovine serum albumin, saccharide and alcohol; and the calibrator(s) or the control material(s) comprise(s) 0.05% to 1.5% w/v preservative.

4. The detection kit for soluble growth stimulation expressed gene 2 (sST2) protein according to claim 3, wherein:

the kit comprises calibrator(s) and/or control material(s), which comprises sST2, 100 mmol/L phosphate buffer pH 5.5, 150 mmol/L NaCl, 5% w/v BSA, 10% w/v sorbitol and 0.1% w/v $NaN_3$.

\* \* \* \* \*